April 17, 1945. F. C. GRIMM, SR 2,374,152
DEVICE FOR ALTERNATING ELECTRIC CIRCUITS
Filed March 24, 1939 2 Sheets-Sheet 1
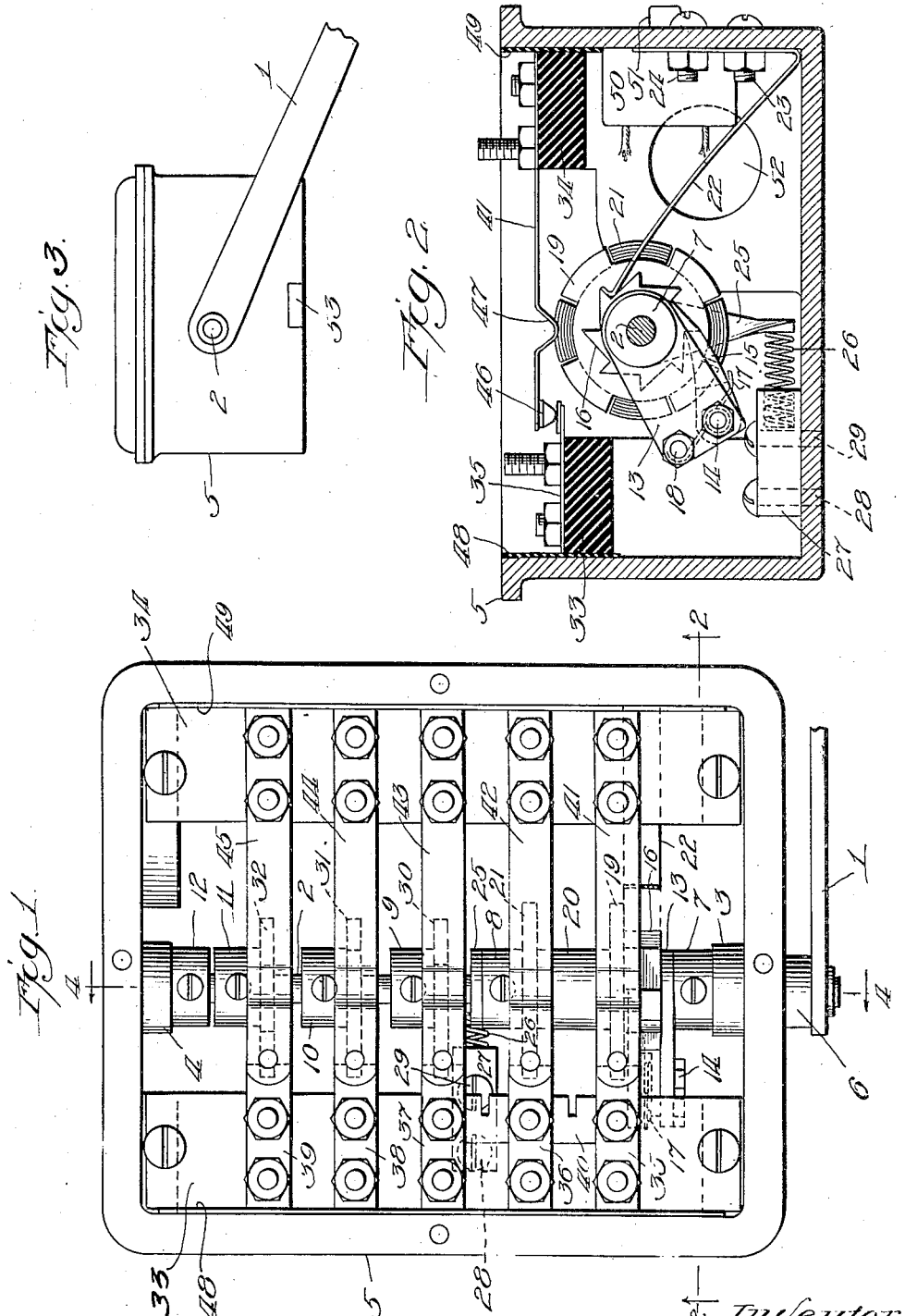
Inventor:
Frank C. Grimm, Sr.
by J. Warren McCaffrey Atty.

April 17, 1945.  F. C. GRIMM, SR  2,374,152
DEVICE FOR ALTERNATING ELECTRIC CIRCUITS
Filed March 24, 1939    2 Sheets-Sheet 2

Inventor:
Frank C. Grimm Sr.
by J. Warren McCaffrey
Atty.

Patented Apr. 17, 1945

2,374,152

UNITED STATES PATENT OFFICE 2,374,152

DEVICE FOR ALTERNATING ELECTRIC CIRCUITS

Frank C. Grimm, Sr., Oak Park, Ill.

Application March 24, 1939, Serial No. 263,842

14 Claims. (Cl. 171—97)

This invention relates to a means for alternating the service to be performed by any multiple installation of equipment which is operated, or started in operation, by an electric motor. The object of this invention is to provide a mechanism adapted to be actuated by a float for the purpose of alternately closing electric circuits to multiple electric motors which operate separate installations of the same equipment.

More specifically the device of this invention is a mechanism, which is actuated by a float on the surface of a liquid, for alternating the use of several pumps so as to distribute the work approximately equally among the number of pumps performing any particular service.

Although the device may have numerous applications it is especially adaptable for alternating the duty performed by two identical sump pumps under normal demand, and impressing both into service during any extraordinary demand for pumping.

A more complete knowledge of the device of this invention can be had from the following description of the several elements of the device and with particular reference to the accompanying drawings, in which Figure 1 is a horizontal view of the alternating device with the cover of the housing removed;

Figure 2 is a vertical sectional view along line 2—2 of Figure 1;

Figure 3 is a side view of the housing containing the alternating device and showing a partial length of the actuating arm;

Figure 4:
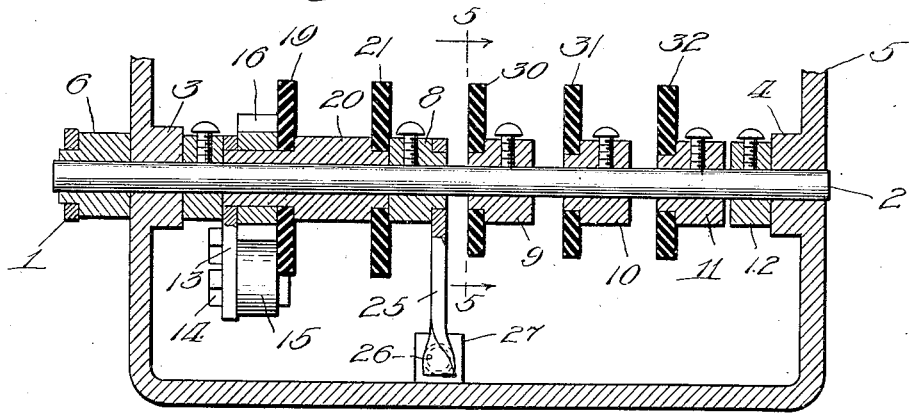
Figure 4 is a vertical sectional view along the center line of the cam shaft 4—4 of Figure 1.

In the several figures of the drawings like numerals refer to identical elements of the device. In Figure 1 a short length of a lever arm 1 is shown fastened in any suitable manner to a cam shaft 2 which is held in place by bearings 3 and 4 on opposite sides of the housing 5. Collars 6, 7, 8, 9, 10, 11 and 12 are spaced along cam shaft 2 at intervals as shown and each is fastened to the shaft by set screws. Collar 7 is fastened to a lug 13 which has fastened to it by bolt 14 a ratchet pawl 15 that engages the teeth of ratchet 16 as shown in Figure 2. In order to keep pawl 15 in position to grip the teeth of ratchet 16 singly a wire spring 17 is wound around bolt 14 and anchored by bolt 18. The free end of spring 17 is bent up the outside of pawl 15 as shown.

Ratchet 16, cam 19, collar 20 and cam 21 are fastened together as a unit assembly in spaced relation to each other and free to rotate on cam shaft 2 as a unit. However, the united assembly is prevented from rotating in the reverse direction by a spring 22 one end of which catches the teeth of ratchet 16, thereby preventing the unit from turning further in that direction, and the other end of which is fastened to the wall of the housing by bolts 23 and 24. Another stop to the counter rotation of the entire cam shaft is provided by arm 25 which is fastened to collar 8 which in turn is secured to shaft 2 as stated before. The free end of arm 25 terminates in a flat face so as to contact spring 26 which compresses in block 27 bolted to the floor of the housing by bolts 28 and 29.

Figure 5:
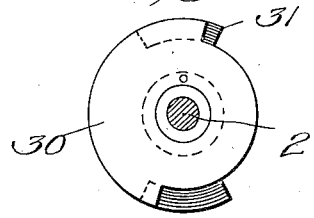
Figure 5 is a vertical sectional view through cam shaft along line 5—5 of Figure 1.

Cams 30, 31 and 32 are secured by suitable means to collars 9, 10 and 11 respectively, which collars are each fastened to cam shaft 2 as previously described. These three cams may be spaced along the cam shaft 2 and the notched segments of the cams may be arranged in any relation circumferentially as the designer chooses, depending upon the timing arrangement the particular electrical circuits employed may require. When using the mechanism described for alternating the service of two sump pumps the inventor has found the circumferential arrangement of cams 30, 31 and 32 as shown in the drawings, especially in Figures 1 and 5, is preferable. Likewise the spaced relation of these cams along shaft 2 as shown in Figures 1 and 4 is desirable for the inventor's particular purpose and is probably easier for the manufacturer to assemble.

Strips of insulating material 33 and 34 are bolted as shown to shoulders provided in the corners of the housing. Thin copper strips 35, 36, 37, 38 and 39 are bolted to strip of insulation 33 at spaced intervals to correspond with the distances separating cams 19, 21, 30, 31 and 32. Electrical contact points may be provided on the ends of strips 35, 36, 37, 38 and 39. A specially thin strip of copper 40 extends along insulation 33 under copper strips 35, 36 and 37 and is held in place by the same bolts that secure those strips to the insulation. On the opposite side of the housing copper strips 41, 42, 43, 44 and 45 are bolted to the bar of insulation 34 at spaced intervals to correspond respectively with the strips 35, 36, 37, 38 and 39 and in such a manner that they extend across the cams 19, 21, 30, 31 and 32 respectively to positions just above the protruding strips 35, 36, 37, 38 and 39. Strips 41, 42, 43, 44 and 45 may also be equipped with special electrical contact points so as to touch those points on the corresponding strips extending from the other side. A pair of these contact points are shown at 46 in Figure 2. Copper strips 41, 42, 43, 44 and 45 are all bent as shown in Figure 2 to form a downwardly extending notch 47 or contact shoulder for riding the extended sections of the cams. To complete the insulation of the copper strips shims 48 and 49 of insulating material are placed between the bars 33 and 34 of insulation and the walls of the housing and as shown in Figure 2 prevent contact between the several copper strips and the walls of the housing.

A manually operated switch 50 is fastened to one wall of the housing and the toggle 51 of the switch extends through the wall to allow for operation from outside the housing. This switch is used when either sump pump and/or its motor is down as explained later on. A circular opening 52 is provided in one side of the housing for passage of electric wires to the several terminal connections of the device. A lug 53 shown only in Figure 3 is for fastening the housing of the device to any surface or equipment desired. A corresponding lug is provided on the opposite side also.

The device as described can be located at any convenient place with respect to the two pumps and the sump they are going to control the liquid level in. Although the sump and the two sump pumps are not shown connected to the mechanism in the accompanying drawings, the operation of the combined equipment is easily understood. A conventional float on the surface of the water in the sump has a rod extending vertically with two lugs on it at predetermined positions along the rod. As the float rises the lower lug will raise the arm 1 of the device and rotate the entire cam shaft through a partial revolution so that cam 19 raises shoulder 41 breaking contact between strips 35 and 41. At the same time the shoulder of strip 42 drops off the outer edge of cam 21 into a segment of the cam which has been cut away and thereby closing contact between strips 36 and 42. Then as the lever arm 1 continues to rise under the motion imparted to it by the float control, and the cam shaft continues to rotate, the shoulder of strip 43 drops off the outer edge of cam 30 into a segment of the cam cut away and extending half way around the cam. This causes a contact to be made between strips 37 and 43. All this time there has been contact between strips 39 and 45 so that on closing the circuit through strips 37 and 43 electric current is supplied to the electric motor for sump pump #2 which can be readily traced in Figure 6.

As the float in the sump descends lever arm 1 does also and in doing so rotates the cam shaft in the opposite direction as before and cam 30 raises the shoulder of strip 43 and breaks contact between strips 37 and 43. This does not break the circuit to motor of pump #2 but prepares the mechanism for cutting in the motor of pump #1. Pump #2 continues to run until cam 32 raises the shoulder of strip 45 thereby breaking contact between strips 39 and 45 and likewise breaking the circuit to motor of pump #2. The float control may or may not continue to descend but the lever arm can only fall slightly after the rotation of cam 32 breaks the circuit to motor #2 because spring 26 will resist further rotation of cam shaft 2 as the lever 25 which is fastened to the cam shaft comes in contact with spring 26 and further rotation of the shaft 2 causes the spring 26 to compress. Just before the lever arm 2 reaches the bottom of its swing after breaking contact as descried between strips 39 and 45 pawl 15 springs in behind the next tooth of ratchet 16 and the apparatus is set for a complete repetition of the cycle of operations. However, the next cycle of operations will close contacts between strips 35 and 41 and 37 and 43 which will complete the circuit to motor #1 used to operate another sump pump, let us say number 1. As before the cycle of operations continues and after the break in contact between strips 39 and 45 breaks the electric circuit to motor #1 the device is set for another repetition of the cycle of operations and motor #2 will be cut into service as before. In that way the device alternates the demand on the different motors and pump.

Whenever there is a large volume of water emptied into the sump causing the float control to continue to rise after one pump has been put into service the vertical rod extending upwards from the float will continue to lift lever arm 1. The continual rise of lever arm 1 will cause the cam shaft 2 to rotate farther than usual. In doing so the shoulder of strip 44 will fall off the outer edge of cam 31 and contact will be made between strips 38 and 44 which completes the electrical circuit to the motor that is not already in service so that both pumps will be operating to remove the abnormal accumulation of water in the sump. As the water is pumped out and the float descends arm 1 will descend causing the cam shaft to rotate and break contact—first between strips 38 and 44 and next between strips 37 and 43. However, during the descent of the float and breaking said contacts both pumps continue to operate. Their motors are cut out simultaneously when the rotation of the cam shaft causes cam 32 to break contact between strips 39 and 45. This feature of cutting out both motors and pumps simultaneously differs from most devices of similar nature which cut out one motor and then another.

There is a safety switch 50 attached to one of the inside walls of the housing which has its toggle switch 51 extending through the housing to the outside so that it can be operated by hand. In the event that any motor or pump is out of order or cannot be used for any reason by closing switch 50 in the electric diagram Figure 6 the apparatus is then set so that each ascent and descent of the float control will be electrically translated to the motor and pump that are in good working order instead of alternating the service between both motors as it would normally. When both sets of motors and pumps are in working order the switch 50 can be operated to break the connection shown and again successive actions of the float control mechanism will alternate and divide the service between the two sets of pumping equipment.

Figure 6:
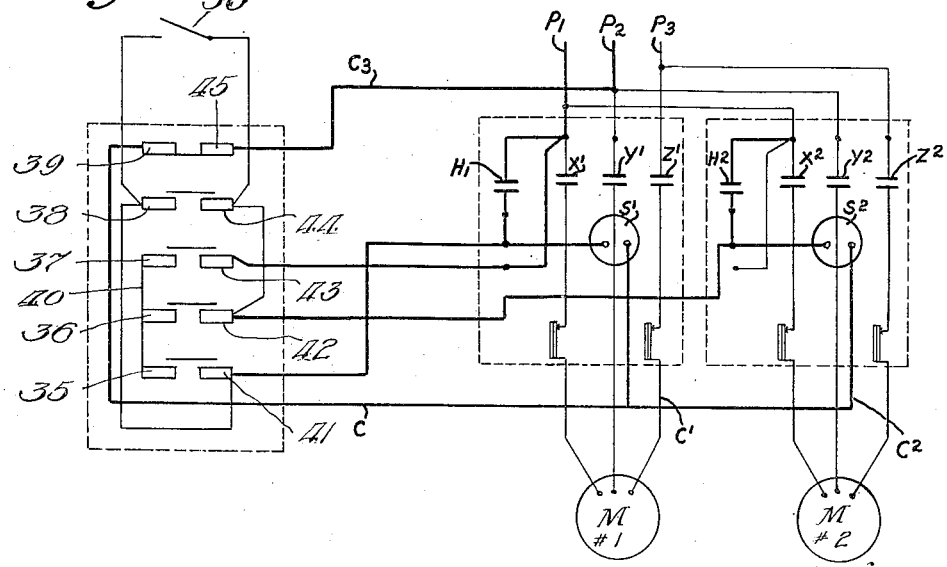
Figure 6 is a diagrammatic view of the electrical circuits through the alternating device to the motors driving the sump pumps.

The diagrammatic drawing Figure 6 shows conventional single phase electrical circuits to two electric motor through the circuit alternating device of this invention. No part of the circuits shown outside of the alternating device illustrated at the left in Figure 6 is claimed as part of this invention. Accordingly numerals for the various magnetic starters and thermal overload devices are not shown on the drawings or described here. The electric diagram shows the use of the invention in a single phase power circuit but its use is in no way limited to single phase and it may be employed equally well on multiple phase circuits. Likewise the device of this invention works equally well on alternating and direct current power circuits.

The above description of a specific embodiment of the alternating device in use with sump pumps is in no way to be construed as a limitation on the device. Neither is the shape of the housing, the materials used, or the float control for operating the lever arm to be limitations on the scope of the invention. The device may be constructed from any suitable materials and have any desirable shape. Likewise the device may be used to divide service among any number of motors although the accompanying drawings show only a device for alternating duty between two motors. If there are more motors on the service line there would have to be a corresponding number of cams in the unit assembly and their fixed relationship and design would depend on the number of motors. And finally the device may be actuated by any suitable means apart from a float control providing the means employed is suitable for causing the lever arm to move in the manner described so as to rotate the cams through suitable arcs as described.

Having thus described my invention what I claim is:

1. In a switching system for energizing and deenergizing of a plurality of electric circuits, switching means to control the energization of the circuits, switching means to control the deenergizing of the circuits, switching means to cause energization of the circuits individually in sequence, in combination with a single means to mechanically operate said energizing, deenergizing and sequential means, said single means being constructed and arranged to cause operation of said sequential means before each circuit-closing movement of said energizing means.

2. In a switching system for energizing and deenergizing a plurality of electric circuits, switching means operable to energize and deenergize circuits to electric power lines, switching means operable to select and establish circuit connections to energize said circuits alternately, and a single mechanical element responsive to conditions to be controlled for mechanically operating all of said switching means and constructed and arranged to accomplish sequential energization of said circuits with each cycle of operation of said operating means.

3. In a switching system, a plurality of main switches for starting electric motors and the like, a single mechanical element responsive to ordinary and extraordinary conditions and including selective switching means, circuit-closing and opening means for normal conditions, and switching means for abnormal conditions, in combination with a control system including connections constructed and arranged in cooperation with said normal switching means and said selective switching means to establish circuits to close said main switches sequentially and separately under normal conditions, and connections constructed and arranged in cooperation with said abnormal-condition switching means to jointly operate said main switches under abnormal conditions.

4. In a switching system, a plurality of main switches for starting electric motors and the like, selective switching means, circuit-closing and opening means for normal conditions, switching means for abnormal conditions and a single means responsive to both normal and abnormal conditions to mechanically operate said selective means and said normal and abnormal switching means, in combination with connections constructed and arranged in cooperation with said selective switching means and said normal switching means to establish circuits to close said main switches sequentially and separately under normal conditions, and connections constructed and arranged in cooperation with said abnormal-condition switching means to jointly operate said main switches under abnormal conditions.

5. In a switching system, a plurality of main switches for starting electric motors and the like, selective switching means, circuit-closing and opening means for normal conditions, switching means for abnormal conditions, and a single means responsive to both normal and abnormal conditions to mechanically operate said selective means and said normal and abnormal switching means, in combination with connections constructed and arranged in cooperation with said selective switching means and said normal switching means to establish circuits to close said main switches sequentially and separately under normal conditions, and connections constructed and arranged in cooperation with said abnormal-condition switching means to jointly operate said main switches under abnormal conditions, said single means cooperating with said selective means and said circuit-opening and closing means to cause said selective means to be operated each time said circuit-opening means is opened.

6. In a switching system, a plurality of main switches for starting electric motors and the like, selective switching means, circuit-closing and opening means operable in response to normal variations in a liquid level, switching means operable under flood conditions, and a single float-operated mechanical element to mechanically operate said selective means and said normal and said flood condition switching means, in combination with connections constructed and arranged in cooperation with said selective switching means and said normal switching means to establish circuits to close said main switches sequentially and separately with normal variations in the liquid level, and connections constructed and arranged in cooperation with said flood-condition switching means to jointly operate said main switches during existence of flood conditions.

7. A plurality of electromagnetically operable switches for starting electric motors and the like in combination with a control system comprising selective switching means, circuit closing means, circuit opening means, and switch means operable with said main switches for holding said main switches closed until said opening means opens, together with connections constructed and arranged in cooperation with said selective means and said circuit closing and opening means to sequentially and alternately operate said electromagnetic switches, and a single means for mechanically operating said selective means and said circuit closing and opening means, said single means being responsive to the conditions to be controlled.

8. A plurality of electromagnetically operable switches for starting electric motors and the like, in combination with a control system comprising selective switching means, circuit closing means, circuit opening means, and switch means operable with said main switches for holding said main switches closed until said opening means opens, together with connections constructed and arranged in cooperation with said selective means and said circuit closing and opening means to sequentially and alternately operate said electromagnetic switches, and a single means for mechanically operating said selective means and said circuit closing and opening means, said single operating means being constructed and arranged to cause operation of said selective means before each operation of said circuit-closing means and to cause closing of the selected electromagnetic switch on one predetermined condition and opening thereof on another predetermined condition.

9. A plurality of electromagnetically operable switches for starting electric motors and the like, in combination with a control system comprising selective switching means, circuit closing means, circuit opening means and switch means operable on occurrence of an abnormal condition, and switch means operable with said main switches for holding said main switches closed until said opening means opens, together with connections constructed and arranged in cooperation with said selective means and said abnormal condition means and said circuit closing and opening means to sequentially and alternately operate said electromagnetic switches under normal conditions and to operate all said electro-magnetic switches under abnormal conditions, and a single means for mechanically operating said selective means and said circuit closing and opening means and said abnormal-condition means.

10. In a switching system for energizing and deenergizing of a plurality of electric circuits, switching means to control the energization of the circuits, switching means to control the deenergizing of the circuits, switching means to cause energization of the circuits individually in sequence, in combination with a single means to mechanically operate said energizing, deenergizing and sequential means, said single means being constructed and arranged to cause operation of said sequential means only when said single means is moving in a predetermined direction.

11. In a switching system, switching means operable to energize and deenergize a plurality of electric circuits, switching means operable to select and establish circuit connections to energize said circuits individually and sequentially, a single means responsive to conditions to be controlled for mechanically operating all of said switching means and constructed and arranged to accomplish sequential energization of said circuits with each cycle of operation of said operating means, and means constructed and arranged to cause said energizing and deenergizing means to close as said single means comes into one position, and to open when said single means comes into another position.

12. A switching system as described in claim 11, further characterized by means constructed and arranged to cause energization of all of the circuits in a third position of said single means during the existence of abnormal conditions.

13. In a switching system for energizing and deenergizing electric circuits, a plurality of remotely controlled circuit makers for energizing and deenergizing a plurality of electric circuits, switching means to operate said remotely controlled circuit makers into closed circuit position, switching means causing said remotely controlled circuit makers to move into open circuit position, switching means to cause operation of said circuit makers individually and sequentially, and a single means responsive to the condition of the work to be done for operating all of said switching means mechanically.

14. In a switching system for energizing and deenergizing electric circuits, a plurality of remotely controlled circuit makers for energizing and deenergizing circuits to power lines, switching means to operate said remotely controlled circuit makers into closed circuit position, switching means causing said remotely controlled circuit makers to move into open circuit position, switching means to cause operation of said circuit makers individually and sequentially, switching means operable under extraordinary conditions to cause operation of all said circuit makers at once, and a single means responsive to ordinary and extraordinary conditions for operating all of said switching means mechanically.

FRANK C. GRIMM, Sr.